United States Patent [19]

Klopsch

[11] 4,285,009
[45] Aug. 18, 1981

[54] APPARATUS FOR PRODUCING CORRECTED COLOR CHROMATIC COMPONENTS

[75] Inventor: Siegfried Klopsch, Probsteierhagen, Fed. Rep. of Germany

[73] Assignee: Dr. Ing. Rudolf Hell GmbH, Fed. Rep. of Germany

[21] Appl. No.: 83,985

[22] Filed: Oct. 11, 1979

Related U.S. Application Data

[63] Continuation of Ser. No. 770,192, Feb. 18, 1977, abandoned.

[30] Foreign Application Priority Data

Feb. 25, 1976 [DE] Fed. Rep. of Germany ....... 2607623

[51] Int. Cl.$^3$ ............................................. H04N 1/46
[52] U.S. Cl. ........................................ 358/76; 358/80
[58] Field of Search ................................... 358/76, 80

[56] References Cited

U.S. PATENT DOCUMENTS

| | | | |
|---|---|---|---|
| 2,790,844 | 4/1957 | Neugebauer | 358/80 |
| 2,981,791 | 4/1961 | Dixon | 358/76 |
| 3,012,093 | 12/1961 | Taudt | 358/80 |
| 3,128,333 | 4/1964 | Loughlin | 358/76 |
| 3,441,663 | 4/1969 | Dreyfoos, Jr. et al. | 358/76 |
| 3,758,707 | 9/1973 | Keller et al. | 358/80 |
| 3,848,856 | 11/1974 | Reeber et al. | 358/76 |
| 3,885,244 | 5/1975 | Keller | 358/80 |
| 3,972,066 | 7/1976 | Seki | 358/76 |
| 4,037,249 | 7/1977 | Pugsley | 358/76 |

*Primary Examiner*—Joseph A. Orsino, Jr.
*Attorney, Agent, or Firm*—Hill, Van Santen, Steadman, Chiara & Simpson

[57] ABSTRACT

A device for producing corrected color chromatic components for multicolor printing wherein an original is scanned and rerecorded in the form of color separations with interposed color corrections including color correction means having an electronic color camera for scanning an original and a color viewing monitor and an adjustable color correction computer connected to the camera so as to correct the trichromatic color signals supplied by the camera and including a color converter connected between the color correction computer and the monitor for compensating for fixed parameters of the respective printing process and for adaptation of the colors to the luminescent materials of the monitor screen and including a scanning for a second scanning of the original and with a recording unit for recording the color chromatic components and wherein after correction of the color components has occurred the computer can be connected to the recording unit and receive signals directly from the scanner for reproduction.

6 Claims, 6 Drawing Figures

APPARATUS FOR PRODUCING CORRECTED COLOR CHROMATIC COMPONENTS

This is a continuation, of application Ser. No. 770,192, filed Feb. 18, 1977 now abandoned.

BACKGROUND OF THE INVENTION

1. Field of the Invention

The present invention relates to a device for reproducing printing reproductions with very accurately controlled color components.

2. Description of the Prior Art

Prior art devices such as shown in German OS 24 45 651 discloses a device in which a raster scanner scans a colored picture as, for example, a color slide or finished color separated components as well and supplies a set of color component signals which are subjected to a color correction and supplied for checking through a printing reproduction computer to a display unit. The color component signals represent the color dosage values for the individual printing colors such as magenta, cyan, yellow and black and are to be corrected on the display unit using visual checking in the apparatus. So as to provide on the display unit the color impressions which are produced by the picture are printed with the corrected color component signals with the aid of the corresponding color chromatic components and the print reproduction computer is provided between the correction stage and the display unit with the computer taking into consideration the fixed parameters of the respecting processes in producing the display. In this apparatus the correction is undertaken and made visible in selected local areas. The corresponding color component signals are measured and are made assessable to a person skilled in the art to rework by hand the selected local areas of the color component slides or plates. These corrections are performed by etching or by photographic exposure with corresponding masks.

Such apparatus has the advantage that the correction is made visible but has the disadvantage that the actual correction of the color chromatic components must be performed by hand which is time consuming and does not assure that the corrections in the color chromatic component separations exactly correspond to the corrections appearing on the display unit since such corrections depend exclusively upon the skill of the craftsman making corrections.

Other devices are known which produce corrected color component separations automatically but where the setting of the correction must be performed manually specifically by means of densitometric measurements of various picture dot image points of the original and by the subsequent evaluation by a craftsman who must then manually set the color correction regulator. Such devices have the disadvantage that the correction also depends on the skill of the operator making the corrections and cannot be checked until the finished color components are the finished printed product is available. Equipping such devices with a display unit could be accomplished, however, because of a peculiarity of these devices, this cannot be realized or requires a very large expenditure for obtaining a suitable memory since the data which are supplied by a drum scanner in such a device spiral scanner or a scanner with intermittent feed are not suitable for producing a stationary picture because each point is scanned only once and controls a drum recording device on line.

SUMMARY OF THE INVENTION

The present invention has the main objective of providing a device for production of corrected color chromatic components which makes possible to adjust for the color corrections with visual checking and an automatic production of the individual color chromatic component separations.

The present invention also provides for compensation for the screen luminescent materials of the monitor. German Pat. OS No. 20 24 183 discloses a system for motion picture technology for the production of polychromatic picture information in which a film is scanned picture by individual picture with a camera and the color signals are digitalized and then are stored in an intermediate storage device as complete pictures. Such color pictures are then corrected digitally using a display screen and are again recorded on film or supplied as TV signals. Such system requires extensive digital electronic components and a number of memory devices and is therefore very expensive. German OS No. 20 24 183 does not indicate in detail how the corrections are accomplished. The main purpose of this disclosure is to combine various individual pictures into a final film and for this reason such system is not suitable for the purpose of the present invention which is to automatically produce corrected color separation components for the printing technology.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
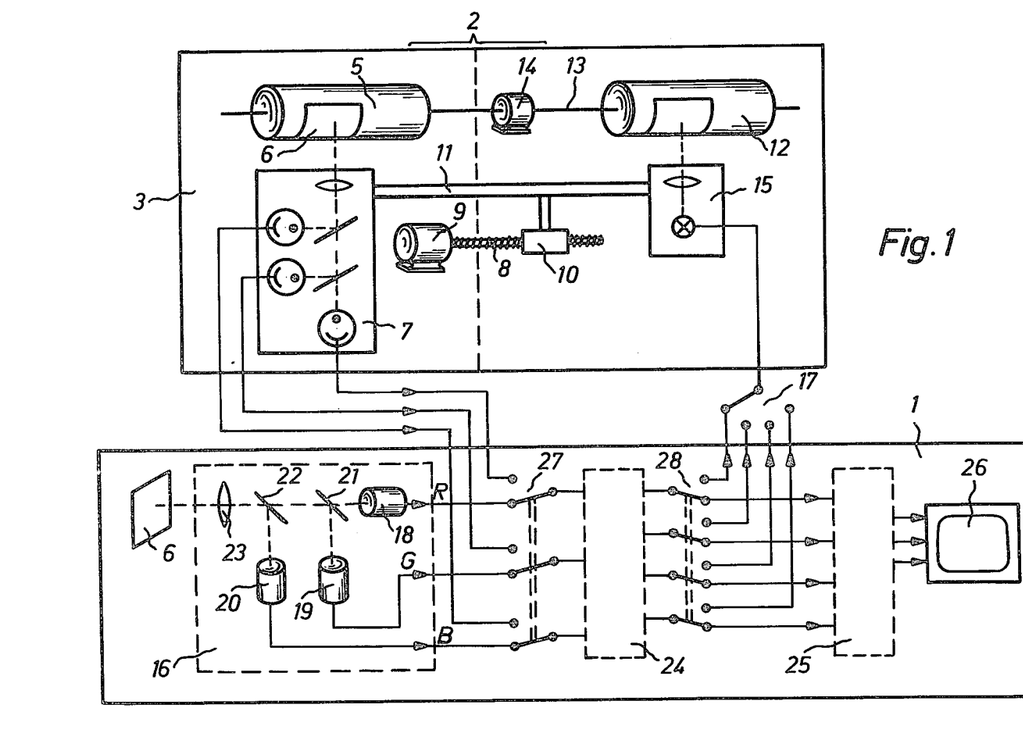
FIG. 1 is a circuit diagram of the invention.

FIG. 1 illustrates a color correction station 1 which is connected to a machine 2 for producing individual color component separations. The machine 2 consists of a scanning unit 3 and a recording unit 4. The scanning unit 3 consists of a scanning drum 5 upon which an original 6 is mounted and which is scanned linewise by a scanning head 7 which is axially moved along the drum by means of a threaded spindle 8. The spindle 8 is driven by a motor 9 and moves the scanning head 7 as the threaded spindle 8 moves the threaded block 10 which is connected to a mechanical rod 11 upon which the scanning head 7 is mounted.

The recording unit 4 includes a recording drum 12 which is mounted with the drum 5 on a common shaft 14 which is driven by a motor 14. The recording of the color component separations is done with the aid of a recording head 15 which is connected to the scanning head 15 that is driven by the mechanical system 11.

Before the production of the color component separations starts the color correction is performed on the color correction equipment 1. For this purpose, an electronic color camera 16 of a known type is provided and the original 6 is scanned in color with the color camera unit 16. Camera tubes 18, 19 and 20 receive the scanned original information via disc mirrors 21 and 22 through an optical system 23. This allows the spectral sensitivity curves of the three color channels of the color camera to be laid out in a fashion such that they coincide with the corresponding color channels of the scanning unit 3. The lens 23 in known TV scanning types for still pictures are preferably zoom lens. The electrical color measurement value signals R, G and B (red, green and blue) obtained from the camera tubes are passed to a color computer 24 from which they pass to a color converter 25 which controls and supplies an output to a color viewing monitor 26. Arrows in the Figure indicate the direction flow of the signals in the signal lines between the various component groups illustrated in FIG. 1.

Figure 2:
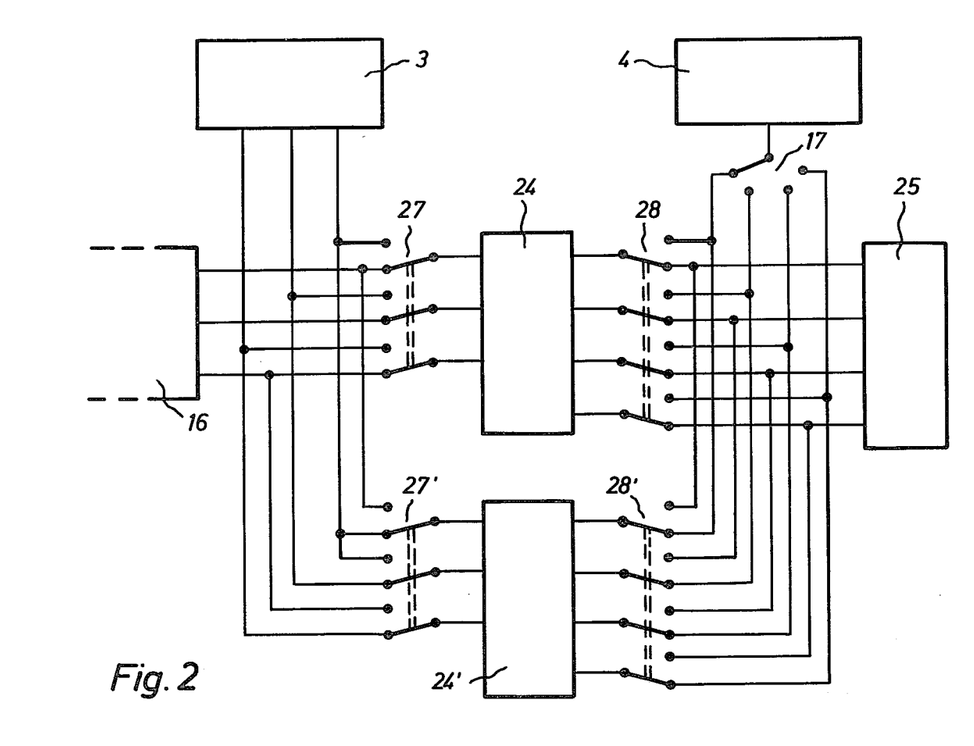
FIG. 2 illustrates a sample embodiment of the invention.

FIG. 2 illustrates a modification of the invention which uses two color computers 24 and 24' for tandem operation. The advantages of this system is that the color viewing location can be better utilized. Although the color correction can be adjusted with one color computer 24 the recording of the color component separations of a previously corrected pattern can be accomplished with the other color computer 24'. For this purpose, the transfer switch contacts 27' and 28' are provided in addition to the transfer switch contacts 27 and 28. The converter 25 can be readjusted to the desired fixed parameters for the various printing processes. These are, for example, the color of the printing paper, the printing colors to be used, etc. This is done primarily by means of a resistant network with linearly and non-linearly responsive elements such as are known in color television technology. With a constant printing process, the converter 25 remains unchanged. If, however, the printing process, the printing colors or the printing paper of the reproduction process is changed, then the same output signals Cy, Mg, Ye and Bl give different color pictures so the computation matrix in the converter 25 must be correspondingly changed or alternatively switched over to standard processes so that the visual picture again corresponds to the printing color picture. The color viewing monitor 26 need not be described since it is generally known and has long been used in color television technology and can be a standard commercially available type monitor.

The procedure of the operator is to place the original pattern 6 in front of the camera and to adjust the signal parameters of the computer 24 in such a way that the picture on the color view monitor appears error-free and color-true. Also, for setting the correction a measurement instrument illustrated in FIG. 6 can be provided for the color chromatic component separation density. The color computer 24 is illustrated in greater detail in FIG. 3 and the color converter is illustrated in FIG. 4.

Once the color computer has been set to the optimal visual picture on the monitor, the actual production of the color chromatic component separations can begin. For this purpose, the original 6 is attached to the scanning drum 5 and the color computer 24 is connected with the aid of the transfer switches 27 and 28 into the equivalent signal path between the scanner and the recording unit 4. The switch 17 allows the selection of particular color chromatic component separation which is being recorded at a particular time on the recording unit 4.

It is also possible to manually or automatically put adjustment data into a memory onto a punch card a magnetic tape or a magnetic plate and to supply them together with a picture pattern into a further computation process. The only prerequisite is that identical color computers be used and the scanning systems be adjusted to identical spectral sensitivity patterns for the three color channels.

It is also possible instead of the drum scanner 3 and the drum recording unit 4 to use flat bed scanners in which the original is scanned on a table which can be moved back and forth and the color chromatic component separation is recorded on a table of this type.

Figure 3:
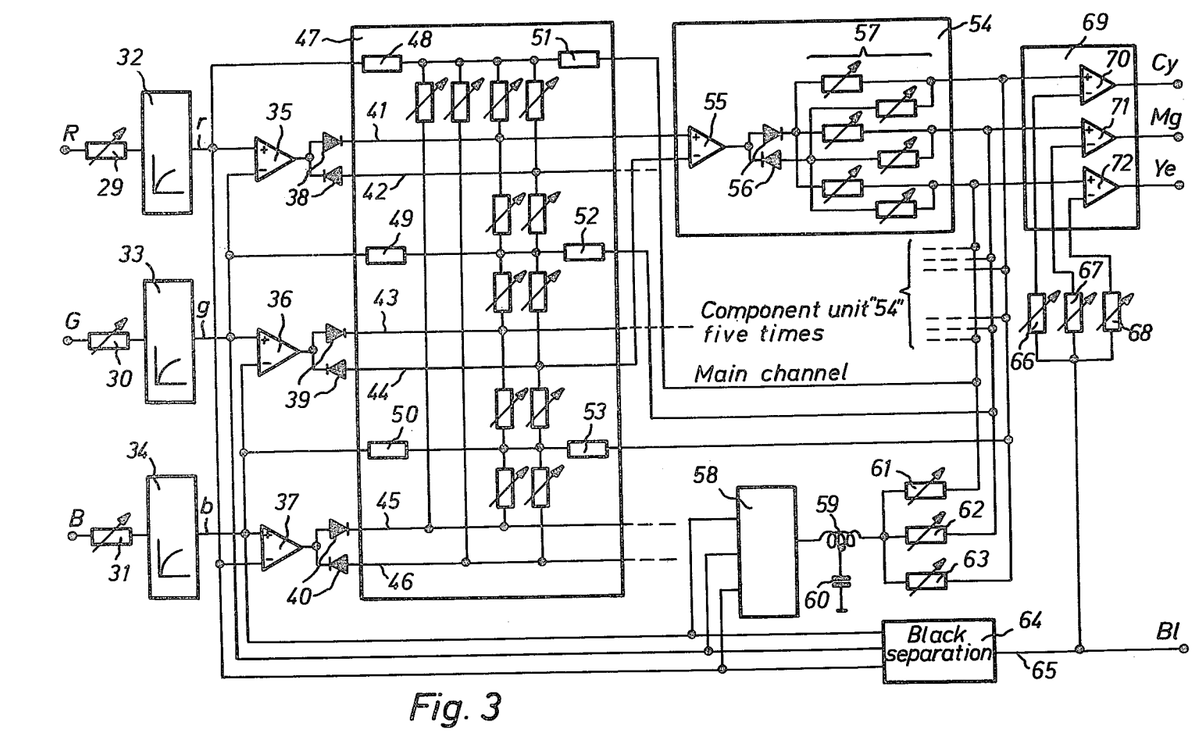
FIG. 3 is a detail schematic of a color computer used in the invention.
Figure 4:
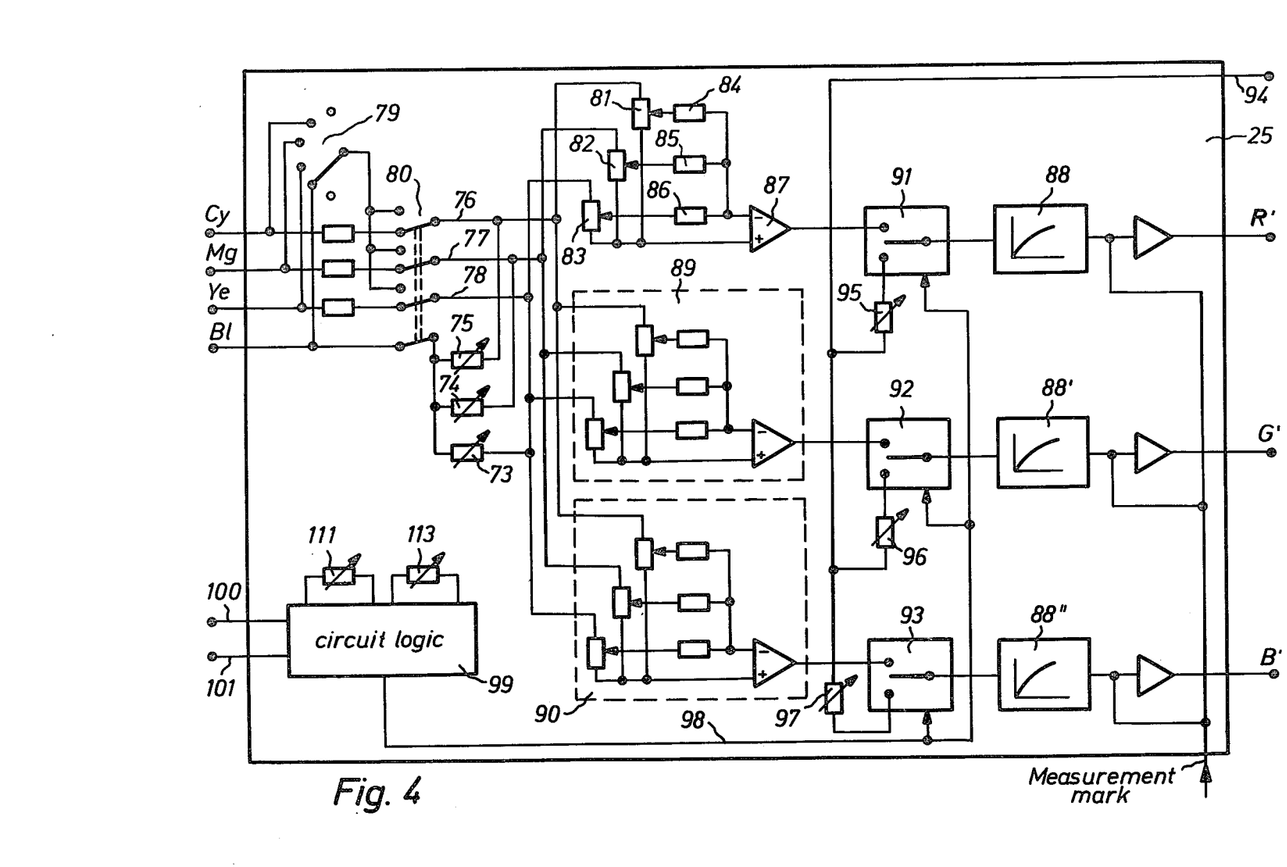
FIG. 4 is a detail schematic of a color converter.

FIG. 3 illustrates in detail the color computer 24. The color signals which have been scanned indicated by R, G and B are first brought to a normal computation level which can be accomplished in the simplest cases with the potentiometers 29, 30 and 31 which respectively receive the signals and can be adjusted to the desired level. Following the potentiometers 29 through 31 are gradation forming elements 32, 33 and 34 respectively, which are known as logrithmers which can be constructed as described in the U.S. Pat. Nos. 3,590,142 and 3,629,490. The output of the logrithmers 32, 33 and 34, respectively, are the signals r, g and b and then the signals r and g are supplied to an operational amplifier 35. The signals g and b are supplied to an operational amplifier 36 and the signals b and r are supplied to an operational amplifier 37. The output of the amplifier 35 is passed through oppositely poled diodes 38 to leads 41 and 42, respectively. The output of the operational amplifier 36 is supplied to oppositely poled diodes 39 to leads 43 and 44, respectively, and the output of the operational amplifier 37 is supplied through oppositely poled diodes 40 to the leads 45 and 46, respectively. The signals on leads 41 through 46 represent the correctional signals which are effective in relatively broad color ranges. These signals are selectively passed with the signals r, g and b through the matrix 47 comprising a plurality of adjustable resistors. To prevent feedback signal from occurring the coupling resistors 48, 49, 50, 51, 52 and 53 are provided in the signal lines for the color signals r, g and b. The signals applied to lines 41 to 46 are converted by subtraction and signal splitting according to operational sign into further selective correction signals in additional computer section 54 which is constructed according to U.S. Pat. No. 3,885,224. The computer 54 is repeated several times as, for example, five times in FIG. 3 and is constructed according to U.S. Pat. No. 3,885,244 but the specific details of a particular computation section 54 is only illustrated a single time in FIG. 3 for simplicity. In computation stage 54 signals +r and −b are supplied to an operational amplifier 55 from which the selective correction signals which are supplied in selectable magnitude into the main channel are formed through diode pair 56 and resistive network 57.

So as to additionally improve the color correction, in other words, to make it more selective, a further color computer 58 is provided which is constructed according to U.S. Pat. No. 3,758,707. For adapting to the transit times within the entire correction system a delay line comprising the components 59 and 60 at the output of the color computer 58 is provided from which the special correction signals are passed to the main channel through adjustable resistors 61, 62 and 63 as shown.

From the primary signals r, g and b the black separation component signal Bl is formed in a stage 64 in a known manner as, for example, described in U.S. Pat. No. 2,766,319 by selecting the maximum signal on line 65 which is passed through variable resistors 66, 67 and 68 and is subtracted from the color corrected components separation signals in stage 69. This is known as color return by means of which the corrected color component separation signals Cy, Mg and Ye are formed. Stage 69 forms the color return and includes the operational amplifiers 70, 71 and 72 which receive the signals shown in FIG. 3 and the values to which the resistors 66, 67 and 68 are set of the black signal are subtracted from the main channel signals and the corrected color separation signals Cy, Mg, Ye and Bl remain. The color computer 24 has a high limiting frequency which means it has a high cut-off frequency and this assures very fine response for the relatively low frequency scanning with the drum scanner.

FIG. 4 illustrates the essential features of the color converter 25. It is first necessary to reintegrate the black signal Bl into the three color signals. In the simplest case this is done by simply adding with the resistors 73, 74 and 75 which are dependent on the amount of the color return of various amounts of the Bl signal onto the Cy, Mg and Ye signals which appear on leads 76, 77 and 78. Initially, at the input the variable colored color components separation signals are initially supplied to a four pole transfer switch 79 and to a selective switch 80. In the switch position illustrated, the operation is switched to normal color presentation. If the switch 80 is moved to the second position then all three color channels 76, 77 and 78 obtain the same signal from the wiper of the switch 79. With the switch 79, each color component separation signal can be individually illustrated on the monitor as a black and white picture. At the same time, the color return compensation is separated by way of resistors 73, 74 and 75 so that the color component separations appear on the picture screen with the complete color return of the color computer 24. In this manner, in the individual representation of the color component separations certain erroneous settings of the color computer can be better recognized than by observing the color picture itself.

From the three color signals on the main channel by means of addition of selected portions, for example, with the aid of potentiometers 81, 82 and 83 through summing resistors 84, 85 and 86 and summing amplifier 87 the trichromatic monitor picture control signals (R', G' and B') are produced after they have been subjected to a gradiation adaptation and gradation adaptation stages 88, 88' and 88''.

These gradation stages take into consideration the gradation of the monitor in order to achieve a linear density gradation on the monitor screen. This is achieved by means of non-linear members which in a known embodiment comprise resistance diode networks which receive bias voltages which are in the negative feedback branches of operational amplifiers.

Potentiometer 81 may, for example, have a high level output and potentiometers 82 and 83 respectively, may operate on low level outputs. If at a particular instance a red area in the pattern is being scanned, than Mg and Ye are printed whereas the cyan signal which is not to be printed has as a "white color" a high value. Then the potentiometer 81 at output R' will have a high value which turns on the red phosphorous of the monitor. If cyan is scanned in the original, then the Mg and Ye signals are large and the cyan signal is small. Because of the low level setting of potentiometers 82 and 83 and the absence of a cyan signal at potentiometer 81 only a very small signal passes through output R' and the red phosphorous barely glows. It is obvious that for the other matrix resistance groups 89 and 90 corresponding situations exist, in other words, from the complementary printing signal a large part is always added and from the other two small signals.

So as to assure a better evaluation of the colors on the monitor, the color picture there is surrounded with a white border by electronic means. For this purpose, the color signals R', G' and B' are supplied through electronic transfer switch contacts 91, 92 and 93 which have at their other poles constant white signal voltages present. The white signal voltage is formed by resistors 95, 96 and 97 from a fixed voltage supplied to line 94. Resistors 95, 96 and 97 serve to adjust to the whiteness of value of the printing paper. The change-over is affected by way of line 98 wherein a signal is generated in a circuit logic 99 from the vertical line deflection signal on line 100 and the horizontal line deflection signal on line 101. A pair of adjustable resistors 111 and 113 control the width and heighth of the white frame border.

It is advantageous to also provide the picture original 6 with a white border of equal illumination value so as to prevent irritation of the eye when comparing the original and the reproduced screen picture.

Figures 5, 6:
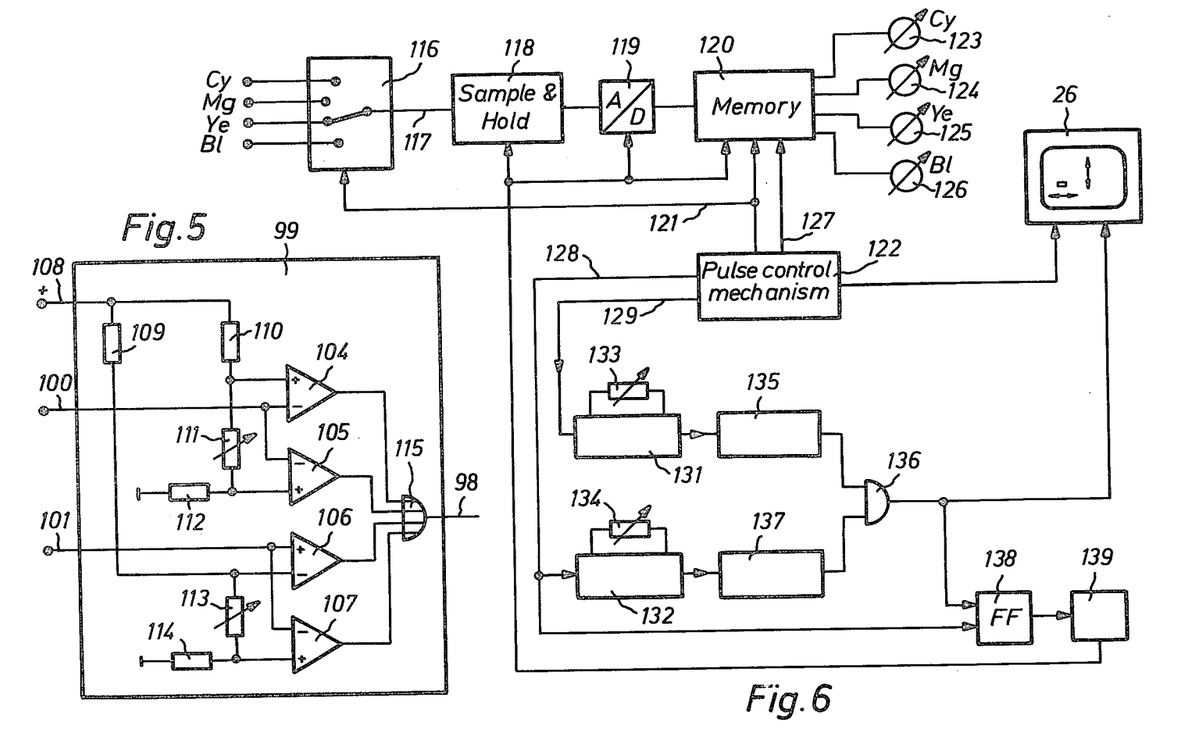
FIG. 5 is a schematic for producing a frame on the monitor.
FIG. 6 is a schematic for producing a movable mark on the monitor.

An example of the circuit logic 99 is shown in FIG. 5. Four comparators 104, 105, 106 and 107 are provided and the comparators 104 and 105 receive the saw-tooth deflection voltage on lead 100 and the comparators 106 and 107 receive the saw-tooth shape deflection voltage on line 101. These signals are compared to fixed voltages obtained from a positive voltage on line 108 and which is supplied through dividing resistors 109, 110, 111, 112, 113 and 114 connected to the comparators 104 through 107 as shown. The second sides of the resistors 112 and 114 are connected to ground as shown. If the positive input to a comparator is greater than the negative input then a positive signal will appear at the output of the comparator and will be passed to the switch line 98 through the OR gate 115 and will switch the monitor to white signal. If, for example, the adjusting resistor 111 is decreased in value, then the comparison voltage will fall at the comparator 104 and rise at comparator 105, in other words the white border zone will become wider.

An additional advantageous embodiment of the invention consists in fading a movable mark into the visual image of the monitor and to use the signal corresponding to the mark for a sample and hold measurement device in order to display the signal values, in other words, the signal density values presented at a particular instant at lines Cy, Mg, Ye and Bl. FIG. 6 illustrates a circuit for accomplishing this result.

In FIG. 6, the color component separations signals Cy, Mg, Ye and Bl are passed through a transfer contact switch 116 to a line 117 which supplies a signal to the sample and hold circuit 118. The output of the sample and hold circuit 118 is supplied through an analog to digital converter 119 to a memory device 120. The sample and hold circuit 118 the analog to digital transducer 119 and the memory 120 are supplied with a common pulse line by which sampling signals of an image dot the A to D transformation and reading the signal into the memory or synchronously controlled. Additionally, a transfer switch over pulse for the transfer switch contact 116 and for the memory 120 is provided which pulse is supplied by a pulse control device 122 through line 121 so as to change-over between the individual color component separation signals in switch 116 and to distribute them in the memory 120 to the various regions associated with the individual color component separation signals.

The pulse control mechanism 122 is known in the prior art and serves in TV for synchronizing the camera and the monitor and supplies the usual pulses for picture start and line start synchronizing pulses.

For the individual color component separation signal, digital display instruments 123, 124, 125 and 126 are connected to the memory 120 and display in a rapid pulse sequence supplied by the pulse control mechanism 122 through line 127 all of the measurement values deposited in the memory in the various regions. This pulse sequence is selected so as to be considerably faster than the change-over transfer pulse and the pulse for reading in the measurement values so that a stationary display occurs in the display instruments.

The determination of the measurement values by the sample and hold circuit 118 is done as a function of the position of the measurement mark on the picture screen of the monitor. For this purpose, the picture start pulse supplied by the pulse control mechanism 122 is passed through line 128 and the line start pulse is passed through line 129 to the monostable flipflops 131 and 132 respectively. The instant of flipping of the flipflops 131 and 132 is delayed by the use of the resistors 133 and 134 which shift the mark on the picture screen of the monitor. The line start pulse is delayed up to 64$\mu$ seconds by resistor 133 as a result of which it is shifted in line direction with a length of a line being about 64$\mu$ seconds. In this way, one can place the pulse in the horizontal position at any point on the line. Connected to the output of the flipflop 131 is a further monostable flipflop 135 which after a fixed delay of 1$\mu$ second emits a positive pulse by means of which the width of the mark is determined to be about 1$\mu$ second. This pulse prepares an AND gate 136 which is connected to the output of the flipflop 135.

The picture start pulse is delayed from 4 to 20$\mu$ seconds in flipflop 132 which is controlled by a resistor 134. The then appearing pulse having a negative edge is passed to a further fixed set time monostable flipflop 137 which has a fixed delay of about 200$\mu$ seconds by means of which the height of the light mark is determined (200$\mu$ sec/64$\mu$ sec=about 3 lines). By means of the positive output pulse of the flipflop 137 and the AND gate 136 connected with its second input to the flipflop 137 which causes the AND gate 136 to pass an indicator gate to the monitor 26.

Connected to the AND gate 136 is a flipflop 138 which has its set input connected to the picture start pulse and is set thereby. By means of the output pulse of the AND gate 136 flipflop 138 is reset and the pulse having a negative edge which is formed in the processes passed to a monostable flipflop 139 connected at the output of the flipflop 138 and the flipflop 139 emits a defined pulse which controls the sample and hold circuit, the analog to digital converter 119 and the reading end of the measured values at the instant of the light mark on the monitor 26. This pulse repeats itself with each picture change and its position is adjustable together with the mark in the horizontal and vertical by means of resistors 133 and 134.

So that the mark appears bright on the monitor the video signal is bright-scanned for the duration of the time the AND gate 136 is enabled. By prescribing the fixed values on the individual color channels of the monitor, colored marks can also be produced. In the representation of color separation, chromatic components and black and white, the measurement mark can be colored in accordance with the chromatic component color separation, for example, yellow with a yellow component separation.

Although the invention has been described with respect to preferred embodiments, it is not to be so limited as changes and modifications may be made therein which are within the full intended scope of the invention as defined by the appended claims.

I claim as my invention:

1. Apparatus for producing corrected color chromatic component separations for multicolor printing, including linewise scanning of an original picture and linewise recording of a picture in the form of color chromatic component separations with interposed color correction, including a color correction means consisting of an electronic color camera for initially scanning an original picture which produces first three color signals, a color viewing monitor which receives second three color signals for monitoring the signal images, an adjustable analog color correction computer connected to the output of said camera to receive said first three color signals therefrom and said color correction computer correcting the trichromatic first three color signals supplied by said camera and producing four corrected color signals, a color converter connected between said color correction computer and said monitor and receiving said four color signals and producing said second three color signals for adjusting fixed parameters for the respective printing process and for adaptation to the colors of the screen luminescent materials of the monitor, a scanner for scanning of the original picture a second time and producing third three color signals, a recording unit adapted to receive said four color signals for recording the color chromatic component separations, and switching means for switching said color correction computer after the correction adjustment has been completed from the color correction means to connect the computer between said scanner and said recording unit such that said color correction computer is connected in the signal path both during monitoring and recording.

2. Apparatus according to claim 1 wherein said electronic color camera has a zoom lens.

3. Apparatus according to claim 1 wherein said monitor includes a mark which is movable on the entire picture screen, and measurement instruments calibrated in printing density are provided so as to measure the initial values of the color components of the picture dots encountered by said mark.

4. Apparatus according to claim 1 wherein said color correction computer has a high limiting frequency.

5. Apparatus according to claim 1 wherein a color channel in the color correction means has one or more color chromatic component separation signals and in the signal path of the color separation signal, a selector switch is provided for making visible on the monitor one of the color chromatic component separation signals of a particular color channel.

6. Apparatus for producing corrected color chromatic component separations for multicolor printing, including linewise scanning of an original picture and linewise recording of a picture in the form of color chromatic component separations with interposed color correction, including a color correction means consisting of an electronic color camera for initially scanning an original picture which produces first three color signals, a color viewing monitor which receives second three color signals for monitoring the signal images, an adjustable analog color correction computer connected to the output of said camera to receive said first three color signals therefrom and said color correction computer correcting the trichromatic first three color signals supplied by said camera and producing four corrected color signals, a color converter connected between said color correction computer and said monitor and receiving said four color signals and producing said second three color signals for adjusting fixed parameters for the respective printing process and for adaptation to the colors of the screen luminescent materials of the monitor, a scanner for scanning of the original picture a second time and producing third three color signals, a recording unit adapted to receive said four color signals for recording the color chromatic component separations, and switching means for switching said color correction computer after the correction adjustment has been completed from the color correction means to connect the computer between said scanner and said recording unit such that said color correction computer is connected in the signal path both during monitoring and recording, and wherein said monitor is provided with a circuit for generating a single color border surrounding the color picture and in which the color of said border can be adjusted to the color of the paper to be printed.

* * * * *